United States Patent
Eriksson et al.

(10) Patent No.: US 7,235,033 B2
(45) Date of Patent: Jun. 26, 2007

(54) COMBUSTION ENGINE FOR A MOTOR VEHICLE

(75) Inventors: Anders Eriksson, Gothenburg (SE); Marcus Steen, Angered (SE)

(73) Assignee: Volvo Lastvagnar AB, Gothenburg (SE)

( * ) Notice: Subject to any disclaimer, the term of this patent is extended or adjusted under 35 U.S.C. 154(b) by 217 days.

(21) Appl. No.: 11/144,517

(22) Filed: Jun. 3, 2005

(65) Prior Publication Data

US 2006/0105881 A1    May 18, 2006

Related U.S. Application Data

(63) Continuation of application No. PCT/SE03/01864, filed on Dec. 3, 2003.

(30) Foreign Application Priority Data

Dec. 12, 2002  (SE) .................................... 0203674

(51) Int. Cl.
    *B60W 10/10*        (2006.01)
(52) U.S. Cl. ....................................  477/107
(58) Field of Classification Search ................ 477/107, 477/120, 702, 904; 701/51, 54, 67, 103, 701/104, 115
    See application file for complete search history.

(56) References Cited

U.S. PATENT DOCUMENTS 4,691,288 A * 9/1987 Kay et al. ...................... 702/41
4,881,627 A 11/1989 Ishii
4,930,374 A 6/1990 Simonyi et al.
4,947,330 A 8/1990 Hiramatsu
5,231,897 A 8/1993 Morita
5,481,909 A * 1/1996 Deutsch et al. ............. 73/117.3
6,234,149 B1 * 5/2001 Mills et al. .................. 123/486
6,237,563 B1 * 5/2001 Froehlich et al. ........... 123/350
6,687,592 B2 * 2/2004 Grob et al. .................... 701/54
6,705,286 B1 * 3/2004 Light et al. .................. 123/396
6,714,852 B1 * 3/2004 Lorenz et al. ............... 701/102
7,010,417 B2 * 3/2006 Edwards et al. ............. 701/110

FOREIGN PATENT DOCUMENTS

GB    2318848 A    5/1998
SE     522591 C2   2/2004

* cited by examiner

*Primary Examiner*—Dirk Wright
(74) *Attorney, Agent, or Firm*—Novak Druce + Quigg, LLP

(57) ABSTRACT

A combustion engine (1) for a motor vehicle, having electronic members (20, 23) with memory function for controlling the output torque of the engine at least in dependence on signals representing an injected quantity of fuel. Reference values of engine torque at different rev speeds are stored in the control members. A torque transmitter (24) detects and transmits to the control members a signal representing the current output torque. The control members compare the current torque with the stored reference value in order to determine whether the performance of the engine is normal.

4 Claims, 1 Drawing Sheet

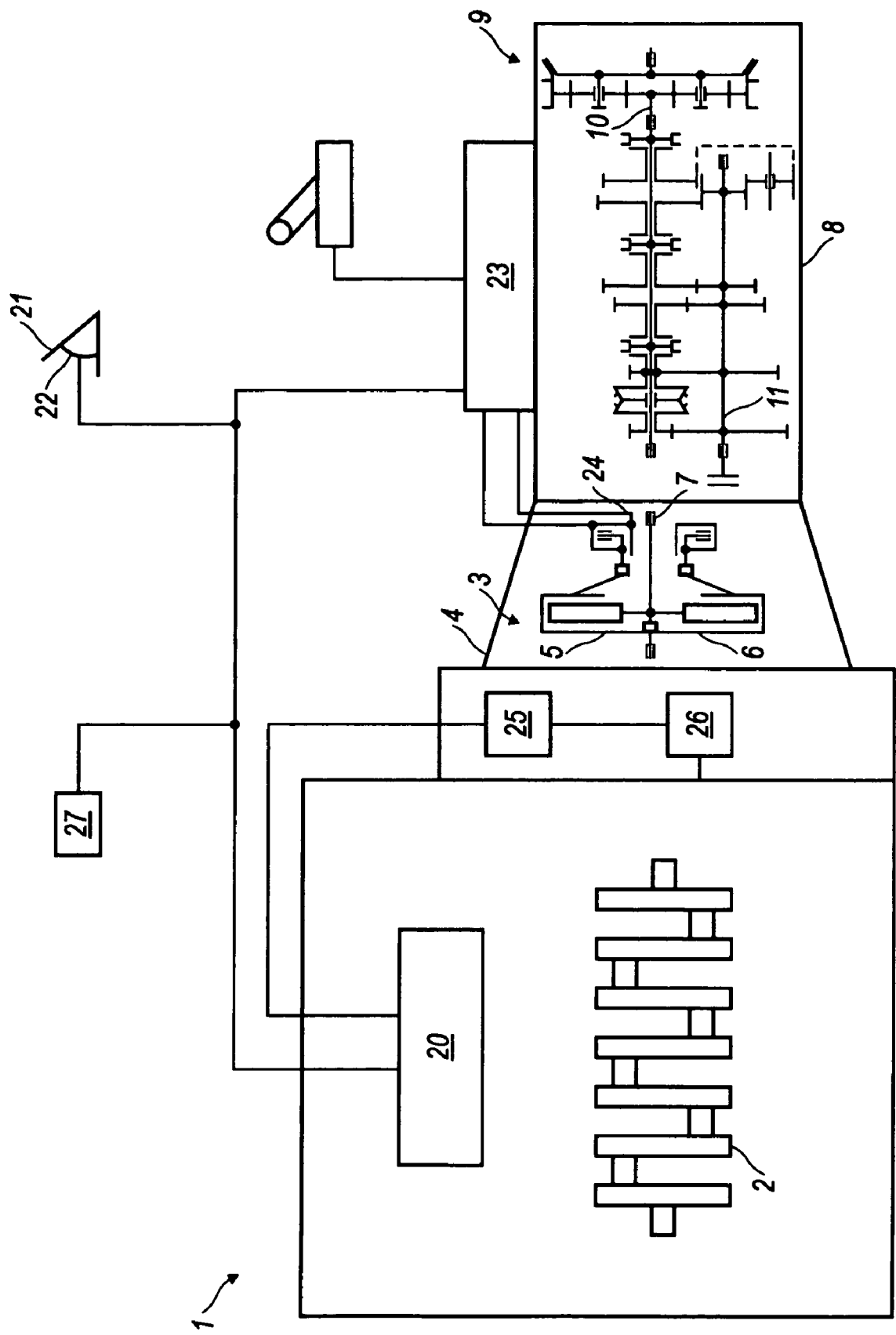

COMBUSTION ENGINE FOR A MOTOR VEHICLE

CROSS-REFERENCE TO RELATED APPLICATIONS

The present application is a continuation patent application of International Application No. PCT/SE2003/01864 filed 03 Dec. 2003 which was published in English pursuant to Article 21(2) of the Patent Cooperation Treaty, and which claims priority to Swedish Application No. 0203674-7 filed 12 Dec. 2002. Said applications are expressly incorporated herein by reference in their entireties.

TECHNICAL FIELD

The present invention relates to a combustion engine for a motor vehicle, having electronic control members with memory function for controlling the output torque of the engine at least in dependence on signals representing a quantity of fuel requested by the driver and injected into the combustion chamber of the engine.

BACKGROUND OF INVENTION

For controlling the torque and revolutional (rev) speed of a combustion engine and controlling the gearshift in an associated autoshift gearbox, it is generally known to utilize control members in the form of microprocessors into which different data is received. Examples of such data include various signals representing different engine and vehicle data, including quantity of fuel requested by the driver (gas pedal position), engine speed, revolutional speed at the input shaft of the gearbox and vehicle speed. These signals are fed into the microprocessor and a number of regulating elements, for example servomotors, precisely regulate the engine speed and the gearshift in the gearbox.

SUMMARY OF INVENTION

An object of the present invention is to produce a combustion engine of the type stated in the introduction and which enables the torque performance of the engine to be constantly diagnosed in order to discover whether the engine has a defect which causes it not to deliver the torque corresponding to the gas pedal lever. An example would be the engine, because of a leak in the intake manifold, delivering too low a torque; or if, as a result of a fault in the boost pressure regulation, produces too high a boost pressure and hence too high a torque.

This is achieved according to the invention by storing reference values of engine torque at different rev speeds in the memory of the control members. A torque transmitter is provided that detects the current output torque from the crankshaft of the engine and transmits to the control members a signal representing the current output torque. Further, the control members are arranged to constantly register and compare the current torque detected by the torque transmitter with the stored reference value at the rev speed in question, and store information on variances between the reference value and the detected current value.

Preferably, the described engine diagnosis function according to the invention is programmed into a control unit, which, apart from the engine control function, also has a transmission control function and is utilized to control a combustion engine and an associated autoshift gearbox, such as described in SE 0201878. The current engine torque is received from a torque transmitter which is coordinated with the input shaft of the gearbox. Apart from utilizing the input shaft torque detected by the torque transmitter to calculate the current road resistance and to select a gear on the basis of the calculated road resistance, the torque detected by the torque transmitter is now also utilized for engine diagnosis.

BRIEF DESCRIPTION OF THE DRAWINGS

The invention is described in greater detail with reference to an illustrative embodiment schematically shown in the appended drawing of a combustion engine with associated gearbox.

DETAILED DESCRIPTION OF THE INVENTION

In the FIGURE, a six-cylinder combustion engine 1 is shown, for example a diesel engine, as is a crankshaft 2 which is coupled to a single-disk dry plate clutch 3 and which is enclosed in a clutch case 4. Instead of a single-disk plate clutch, a double-disk clutch can be used. The crankshaft 2 is non-rotatably connected to the clutch housing 5 of the clutch 3, while its plate disk 6 is non-rotatably connected to an input shaft 7, which is rotatably mounted in the casing 8 of a gearbox denoted in general terms by 9. Mounted rotatably in the casing 8 are a main shaft 10 and an intermediate shaft 11.

The gearbox 9 can be of the type which is shown and described in the aforementioned SE 0201878-6 which is expressly incorporated herein for purposes of disclosure in its entirety—especially with respect to the construction and operation of the gearbox 9, together with the combustion engine 1.

The engine 1 is controlled by an electronic control unit 20 with memory function, which regulates the engine torque in dependence on signals representing a quantity of fuel requested by the driver, which signals can be received from a transmitter 22 coordinated with a gas pedal 21. The engine control unit communicates with an electronic transmission control unit 23 which controls the gearshift in the gearbox. The transmission control unit 23 receives constant information about, and registers the current engine torque via an injected quantity of fuel.

The transmission control unit 23 also receives constant information about the current torque at the input shaft 7 of the gearbox via a torque transmitter 24 coordinated with the input shaft, which torque transmitter can be a type which is known per se and has previously been used in a laboratory context, and which utilizes the signal from the torque transmitter 24 to calculate the current road resistance. The transmission control unit 23 thus determines gear selection and gearshift time on the basis of the actual road resistance and not in response to the engine torque calculated via an injected quantity of fuel, which engine torque, after all, is affected by the load from one or more auxiliary units 25 driven from one or more engine-driven/engine-mounted power points 26 in front of the clutch 3. The auxiliary units 25, which can be, for example, a hydraulic pump, cooling fan, generator, compressed-air compressor or AC compressor, can be connected up for driving of the engine or disconnected by means of manual and/or automatic controls 27 connected to the engine control unit 20.

The torque detected by the torque transmitter 24 at the input shaft 7 of the gearbox is utilized according to the present invention to diagnose the torque performance of the engine in order to discover whether the engine is faulty and is not delivering the torque corresponding to the gas pedal lever. It can, for example, feel "sluggish", owing to a leak affecting the air supply to the engine cylinders, or "spirited", owing to a fault in boost pressure regulation, which produces too high a boost pressure and too great a quantity of air to the cylinders.

To this end, reference values of engine torque at different rev speeds are stored according to the invention in the engine control unit 20. These reference values can be obtained by the use of manually programmed-in values and by the reading of engine performance during test running of the engine in a test running device prior to delivery. By reading the maximum engine torque at a number of different rev speeds and extrapolating the read-off values, it is possible to determine the maximum torque curve of the engine within the rev speed range of the engine, which is then stored in the control unit.

The transmission control unit 23 registers via the engine control unit 20 the current engine torque (by means of the injected quantity of fuel) and via the torque transmitter 24 the current torque at the input shaft 7 of the gearbox at the current engine speed.

With this information, together with information on the state of the auxiliary units 25 (connected or disconnected), the transmission control unit 23 can calculate the engine torque for different engine speeds and compare this with the reference value in order to determine whether the engine performance is normal. If variance from normal performance is indicated, this variance is stored in the control unit, so that, for example, service personnel, when connecting reading equipment to the control unit, can determine whether performance is above or below normal; i.e., whether output torque lies above or below the reference value.

Where variance from normal performance is indicated, it is also conceivable to have the control unit report this directly in the vehicle, for example on a drive data display.

Registration of variances from normal performance also, of course, includes registration of variances in which the engine torque is negative when the engine is braked since the quantity of fuel requested by the driver can be zero. Just as the registration of variance of positive torque from a reference value takes account of whether one or more auxiliary units 25 are switched on, the registration of negative torque takes account of whether one or more auxiliary brake units (not shown), for example compression brake or exhaust brake, are activated.

The invention has been described above with reference to an embodiment, illustrated in the drawing, having separate engine and transmission units which communicate with each other; but within the scope of the invention, the engine and transmission control functions can also, of course, be integrated in one and the same control unit. If the torque transmitter is not utilized to control the gearshift, it has no need to be coordinated with the input shaft of the gearbox, but can then, where appropriate, be coordinated with the crankshaft of the engine.

What is claimed is:

1. A combustion engine for a motor vehicle comprising:

electronic control members (20, 23) with memory function for controlling the output torque of the combustion engine at least in dependence on signals representing a quantity of fuel requested by the driver and injected into the combustion chamber of the engine;

said control members having stored reference values of engine torque at different rev speeds;

a torque transmitter (24) that detects the current output torque from a crankshaft (2) of the engine and transmits to the control members (20, 23) a signal representing the current output torque; and said control members configured to constantly register and compare the current torque detected by the torque transmitter with the stored reference value at an indicated rev speed and store information on variances between the reference value and the detected current value.

2. The combustion engine as recited in claim 1, wherein the control members (20, 23) are configured to indicate whether the current detected value lies above or below the stored reference value.

3. The combustion engine as recited in claim 1, further comprising:

at least one auxiliary unit (25) that by means of one of manual and automatic switching members (27) are releasably coupled to a power point (26) on the engine and the control members (20, 23) are configured to take account of whether the auxiliary unit is connected or disconnected when comparing the stored reference value with the current torque.

4. The combustion engine as recited in claim 1, further comprising:

an autoshift gearbox which has an input shaft which can be connected in drivable arrangement to the crankshaft of the engine, wherein the torque transmitter (24) is coordinated with the input shaft (7) of the gearbox and the control members (20, 23), apart from the engine control function, also have a transmission control function for controlling the gearshift in dependence on signals, fed into the control members, representing the selected gear plus various engine and vehicle data, which at least include engine speed, rev speed at the input shaft of the gearbox and vehicle speed, and in that the control members are configured to calculate the current road resistance in response to the current torque at the input shaft detected by the torque transmitter and to select a gear on the basis of the calculated road resistance.

* * * * *